US007594031B2

(12) United States Patent
Horton et al.

(10) Patent No.: US 7,594,031 B2
(45) Date of Patent: Sep. 22, 2009

(54) NETWORK ADDRESS SELECTION

(75) Inventors: Noah Horton, Sammamish, WA (US); David G. Thaler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 724 days.

(21) Appl. No.: 11/227,596

(22) Filed: Sep. 15, 2005

(65) Prior Publication Data

US 2007/0061485 A1    Mar. 15, 2007

(51) Int. Cl.
*G06F 15/16* (2006.01)
(52) U.S. Cl. ............................ 709/245; 709/200
(58) Field of Classification Search ............... 709/200, 709/245
See application file for complete search history.

(56) References Cited

U.S. PATENT DOCUMENTS

| 5,537,417 | A  | * | 7/1996  | Sharma et al. ............... 709/228 |
| 6,324,537 | B1 |   | 11/2001 | Moran et al. |
| 6,539,380 | B1 |   | 3/2003  | Moran et al. |
| 6,795,434 | B1 | * | 9/2004  | Kumar et al. ............... 370/392 |
| 2002/0112058 | A1 |   | 8/2002  | Weisman et al. |
| 2003/0055892 | A1 |   | 3/2003  | Huitema et al. |
| 2004/0073659 | A1 | * | 4/2004  | Rajsic et al. ............... 709/224 |
| 2004/0103288 | A1 |   | 5/2004  | Ziv et al. |
| 2004/0111469 | A1 |   | 6/2004  | Manion et al. |
| 2004/0148333 | A1 |   | 7/2004  | Manion et al. |
| 2005/0004916 | A1 |   | 1/2005  | Miller et al. |
| 2005/0138166 | A1 | * | 6/2005  | Blanchet ............... 709/224 |
| 2005/0149204 | A1 |   | 7/2005  | Manchester et al. |
| 2006/0069814 | A1 |   | 3/2006  | Abraham et al. |
| 2006/0069840 | A1 |   | 3/2006  | Corbett et al. |
| 2006/0101456 | A1 |   | 5/2006  | Crosier et al. |

OTHER PUBLICATIONS

Guo et al., End-to-End Mobility Support in IPv6 Using Peer-to-Peer Technologies, Mar. 29, 2004, ftp://ftp.research.microsoft.com/pub/tr/TR-2004-29.pdf.*
Draves, RFC 3484: Default Address Selection for IPv6, Feb. 2003, http://www.ietf.org/rfc/rfc3484.txt.*
Draves, F., Default Address Selection for Internet Protocol Version 6 (IPv6), The Internet Society 2003, http://www.ietf.org/rfc/rfc3484.txt.
Chappell, D., "Introducing Indigo: An Early Look," Microsoft Corporation 2005, http://msdn.microsoft.com/library/en-us/dnlong/html/introindigov1-0.asp?frame=true, 18 pages.
Box, D., "Code Name Indigo: A Guide to Developing and Running Connected Systems with Indigo," Microsoft Corporation 2005, http://msdn.microsoft.com/msdnmag/issues/04/01/indigo/?print=true, 11 pages.

* cited by examiner

*Primary Examiner*—Joon H Hwang
*Assistant Examiner*—Mark Pfizenmayer
(74) *Attorney, Agent, or Firm*—Marshall, Gerstein & Borun LLP

(57) ABSTRACT

A method of determining a source address to publish and a destination address to use for a network, including a PNRP network, is disclosed such that the probability of reaching a network node without repeated re-tries is maximized.

4 Claims, 7 Drawing Sheets

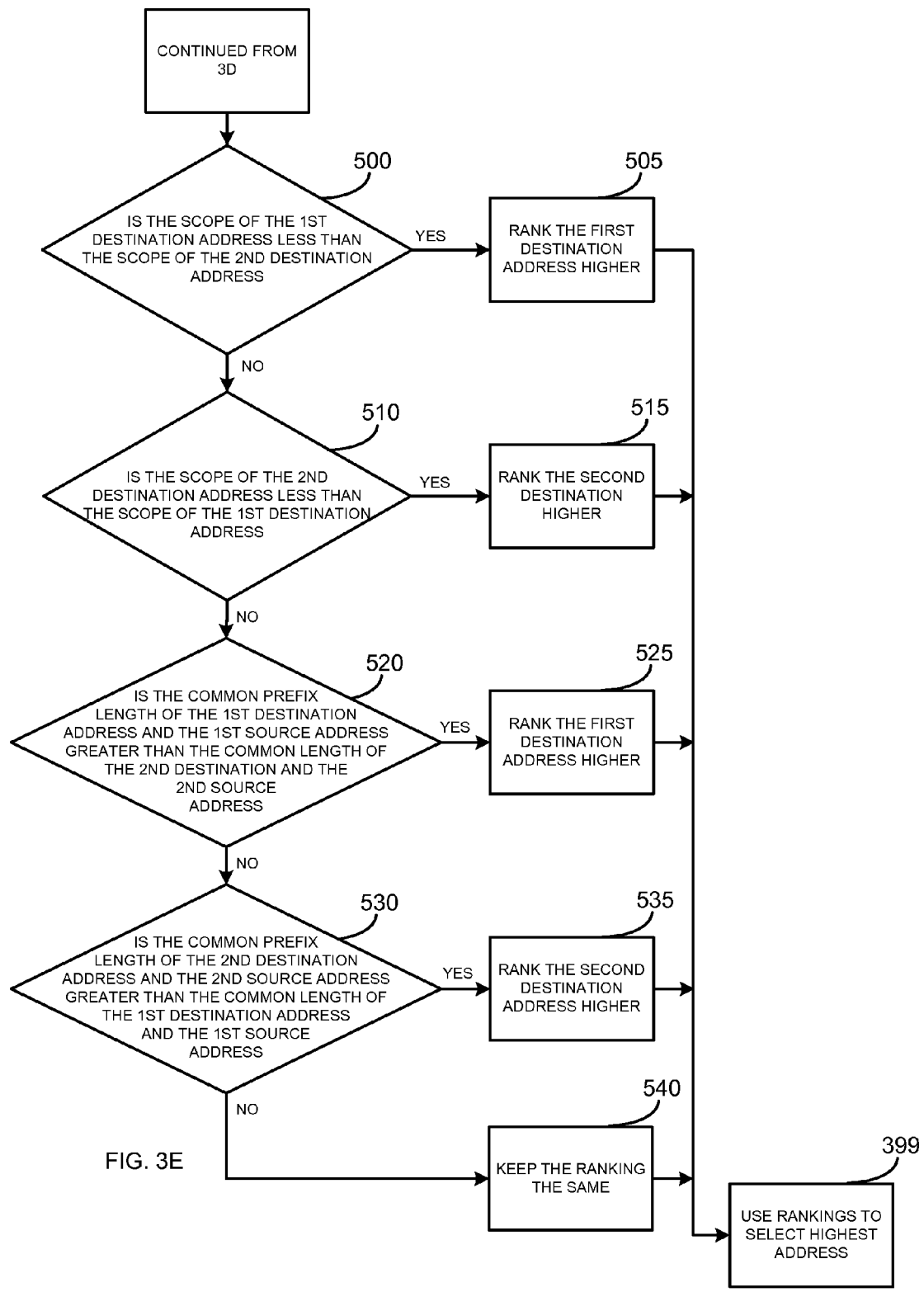

NETWORK ADDRESS SELECTION

BACKGROUND

Client applications in the IPv6 world that want remote users to be able to connect to them need to decide what IP addresses to publish to the world. Given bandwidth constraints and constraints of some name resolution protocols (such as Peer Name Resolution Protocol), the application must limit the number of addresses to a subset of all possible addresses. This creates the need for an application to decide which subset to advertise. Furthermore, in the future, many computers will have access to firewall traversal technology, which introduces a new type of IPv6 address which is incompatible with other addresses. This further complicates the issue of address selection.

Algorithms exist today that can sort a list of addresses for a machine in the order in which to attempt to connect to them to ensure that the connectivity used is optimal in terms of interface preference and routing efficiency at the expense of often requiring attempting to connect to numerous addresses in the list before finding one for which the connection attempt succeeds. While that is often acceptable for point-to-point applications, distributed or P2P systems that wish to use IPv6 often need to connect to many different machines only once. That makes the prioritization different, requiring a prioritization of success on the first address to optimal routing or interface choice.

SUMMARY

A method of determining a source address to publish and a destination address to use for a network, including a Peer Name Resolution Protocol (PNRP) network is disclosed such that the probability of reaching a network node without repeated re-tries is maximized. The source node may review the primary port connectivity and choose a source address that best matches the primary port connectivity mode. The destination address method may perform a series of comparisons and based on the comparison, may choose a destination address that is determined to be a best match for a given source address.

DRAWINGS

FIGS. 3a-3e are an illustration of a flow diagram in accordance with the claims.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
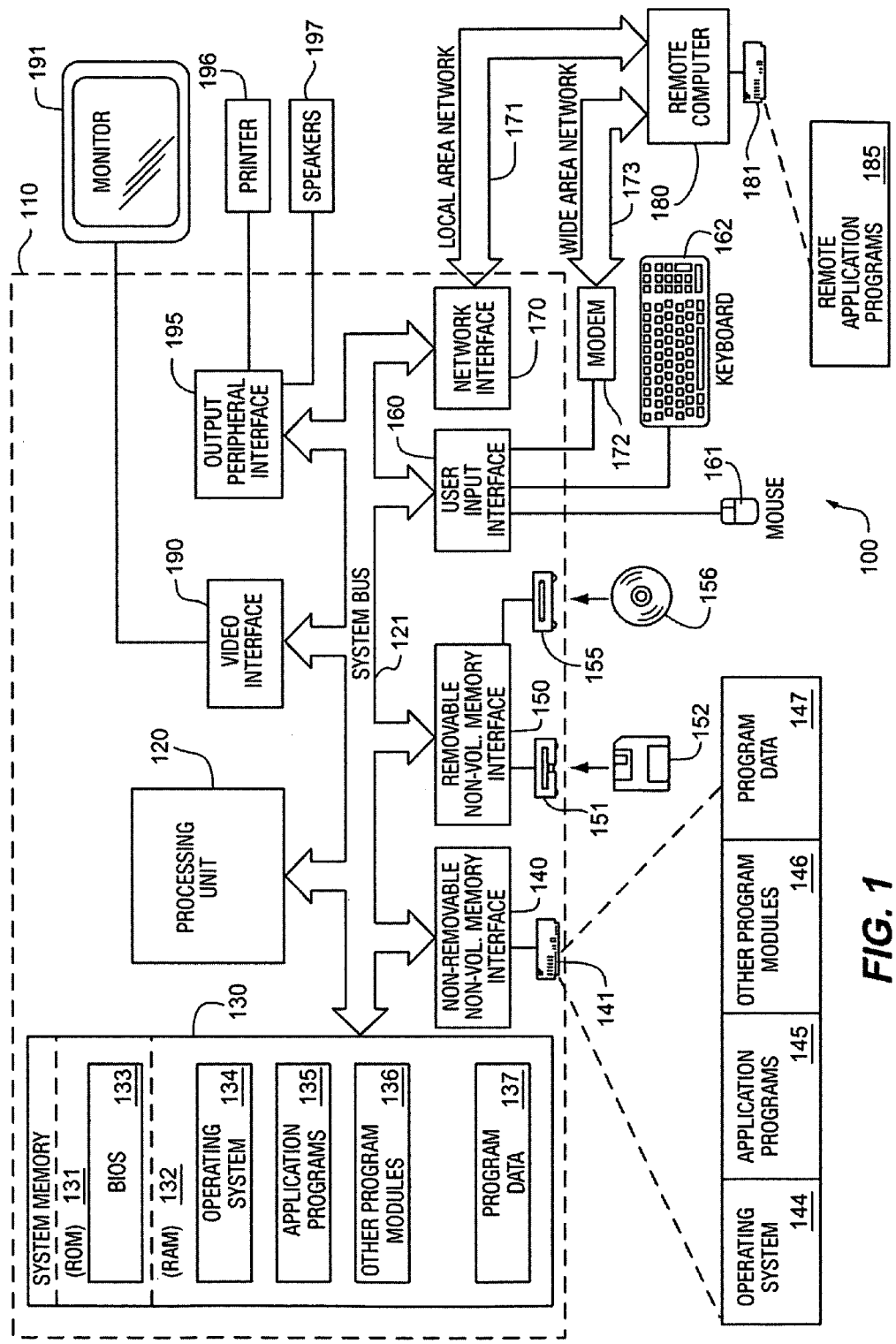
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In modem networking, the IPv6 addressing architecture allows multiple unicast addresses to be assigned to interfaces. These addresses may have different reachability scopes, such as link-local, site-local, or global. These addresses may also be "preferred" or "deprecated." Privacy considerations have introduced the concepts of "public addresses" and "temporary addresses." The mobility architecture introduces "home addresses" and "care-of addresses." In addition, multi-homing situations will result in more addresses per node. For example, a node may have multiple interfaces, some of them tunnels or virtual interfaces, or a site may have multiple Internet Service Provider ("ISP") attachments with a global prefix per ISP. Different tunneling interfaces may be unable to communicate with each other. The end result is that IPv6 implementations will very often be faced with multiple possible source and destination addresses when initiating communication. It may be desirable to have default algorithms, common across all implementations, for selecting source and destination addresses so that developers and administrators may reason about and predict the behavior of their systems.

The claims are specified as a set of rules that define a partial ordering on the set of addresses that are available for use. In the case of source address selection, a node typically has multiple addresses assigned to its interfaces, and the source address ordering rules define which address is the "best" one to use. In the case of destination address selection, a name resolution system may return a set of addresses for a given name, and an application needs to decide which one to use first, and in what order to try others should the first one not be reachable. The destination address ordering rules, when applied to the set of addresses returned by a name resolution system, provides such a recommended ordering. A common context underlies both the source and destination selection methods.

In one implementation, applications use APIs like getaddrinfo( ) that return a list of addresses to the application. This list might contain both IPv6 and IPv4 addresses (sometimes represented as IPv6-mapped addresses). The application may pass a destination address to the network stack with connect( ) or sendto( ). The application may try the first address in the list, looping over the list of addresses until it finds a working address. In any case, the network layer is never in a situation where it needs to choose a destination address from several alternatives. The application might also specify a source address with bind( ), but often the source address is left unspecified. Therefore, the network layer does often choose a source address from several alternatives.

As a consequence, implementations of getaddrinfo( ) or similar APIs may use the destination address selection algorithm specified here to sort the list of IPv6 and IPv4 addresses that they return. Separately, the IPv6 network layer will use the source address selection algorithm when an application or upper-layer has not specified a source address. The methodology may also be applied to peer-to-peer networks, such as a PNRP network, when obtaining a working connection without repeated re-tries is of primary importance.

Peer-to-peer networking is the utilization of the relatively powerful personal computers (PCs) that exist at the edge of the Internet for more than just client-based computing tasks. The modern PC has a very fast processor, vast memory, and a large hard disk, none of which are being fully utilized when performing common client/server computing tasks such as e-mail and Web browsing. The modern PC can easily act as both a client and server (a peer) for many types of applications.

PNRP

Instead of relying on the Domain Name System (DNS) to resolve names for peer communication, Windows Peer-to-Peer Networking uses Peer Name Resolution Protocol (PNRP). PNRP has the following attributes:

Distributed and Serverless for Name Resolution

Like DNS, the complete list of names is stored on computers throughout the cloud. Unlike DNS, there are no servers that provide name resolution. Each peer stores a portion of the list in its cache and can refer to other peers. Central servers are not used to resolve names. Windows Peer-to-Peer Networking is not strictly serverless, as there is a seed node that facilitates initialization.

The Use of Identifiers (IDs) Instead of Names

Rather than using a name, such as a fully qualified domain name in DNS, IDs are used to identify peer entities. IDs are just numbers and therefore are not subject to language and trademark or copyright issues.

The Use of Multiple IDs

Each separate peer computer, user, group, device, service or other type of peer node can have its own peer ID. One machine may host multiple names, and a given name may be hosted by multiple machines.

Ability to Scale to Large Numbers of IDs

The list of IDs is distributed among the peers using a multi-level cache and referral system that allows name resolution to scale to billions of IDs, while requiring minimal resources on each node.

Peer Names and PNRP IDs

A peer name is an endpoint for communication, which can be a computer, a user, a group, a service, or anything else that you want to resolve to an IPv6 address, protocol, and port number. PNRP IDs are 256 bits long and are composed of the following:

The high-order 128 bits, known as the peer-to-peer (P2P) ID, are a hash of a peer name assigned to the endpoint.

The low-order 128 bits are used for the service location, which is a generated number that uniquely identifies different instances of the same P2P ID in the same cloud.

The 256-bit combination of P2P ID and service location allows multiple PNRP IDs to be registered from a single computer.

For each cloud, each peer node manages a cache of PNRP IDs that includes both its own registered PNRP IDs and the entries cached over time. The entire set of PNRP IDs located on all the peer nodes in a cloud comprises a distributed hash table.

Each entry in the PNRP cache contains the PNRP ID, a certified peer address (CPA), and the IPv6 address of the registering node. The CPA is a self-signed certificate that provides authentication protection for the PNRP ID and contains application endpoint information such as addresses, protocol numbers, and port numbers.

The name resolution process consists of resolving a PNRP ID to a CPA. After the CPA is obtained, communication with desired endpoints can begin.

PNRP Name Resolution

When a peer wants to resolve the peer name to its address, protocol, and port number, it constructs the P2P ID based on the peer name. The peer examines the entries in its own cache for an entry that matches the P2P ID. If found, the peer sends a PNRP Request message to the peer with the P2P ID and waits for a response. This behavior ensures that the peer node with which communication is desired is active in the cloud.

If a matching entry in its cache is not found, the peer sends a PNRP Request message to the peer that corresponds to the entry that has a P2P ID that is numerically closest to the P2P ID being resolved. The node that receives the PNRP Request message examines its own cache. If found, it forwards the request to the intended node and the intended node sends a response back through the request path. If not found, it sends a PNRP Request message to the peer that corresponds to the entry that has a P2P ID that is numerically closest to the P2P ID being resolved, and so on until the correct peer is found.

Figure 2:
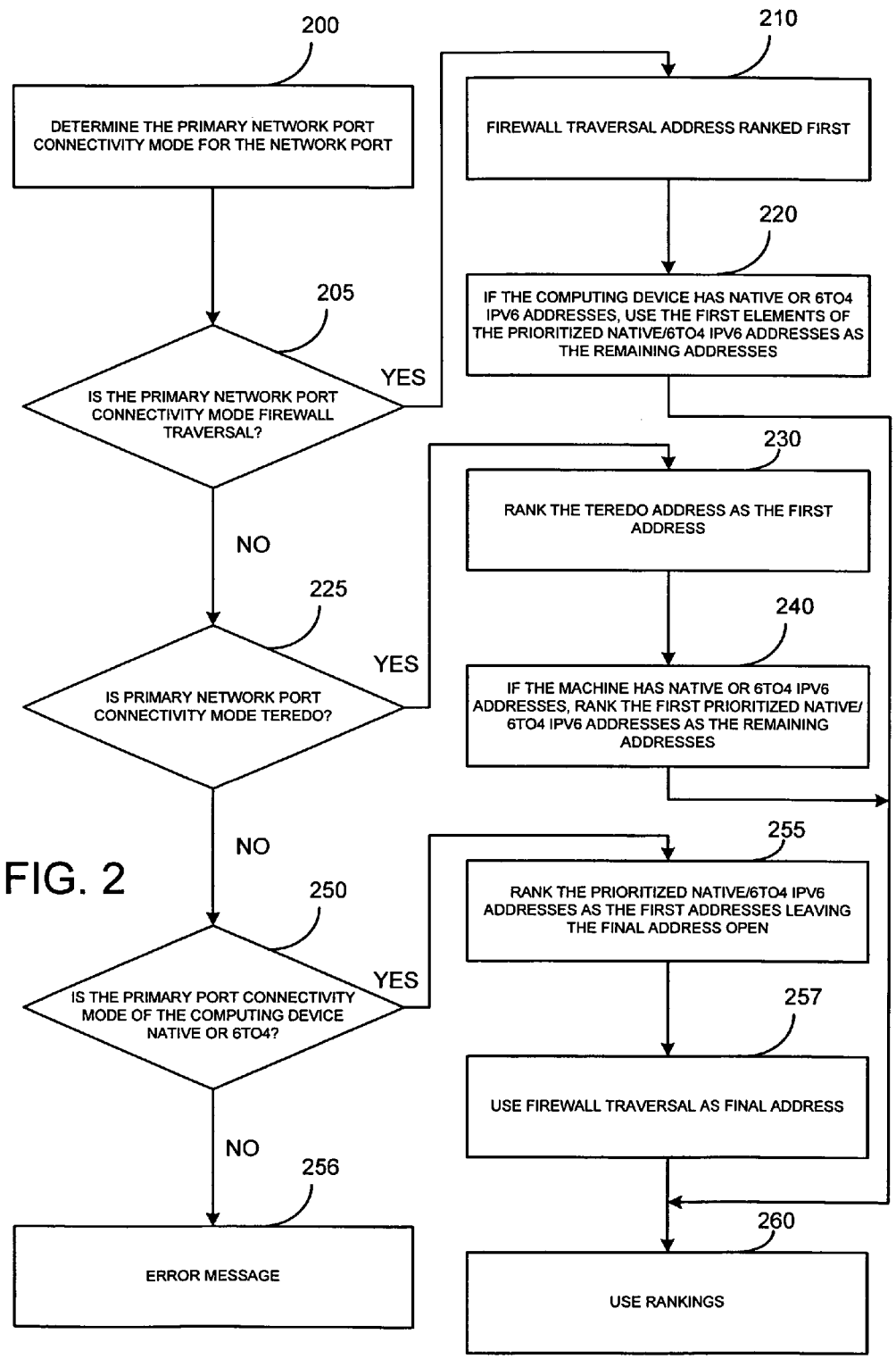
FIG. 2 is an illustration of a flow diagram in accordance with the claims.
Figure 3A:
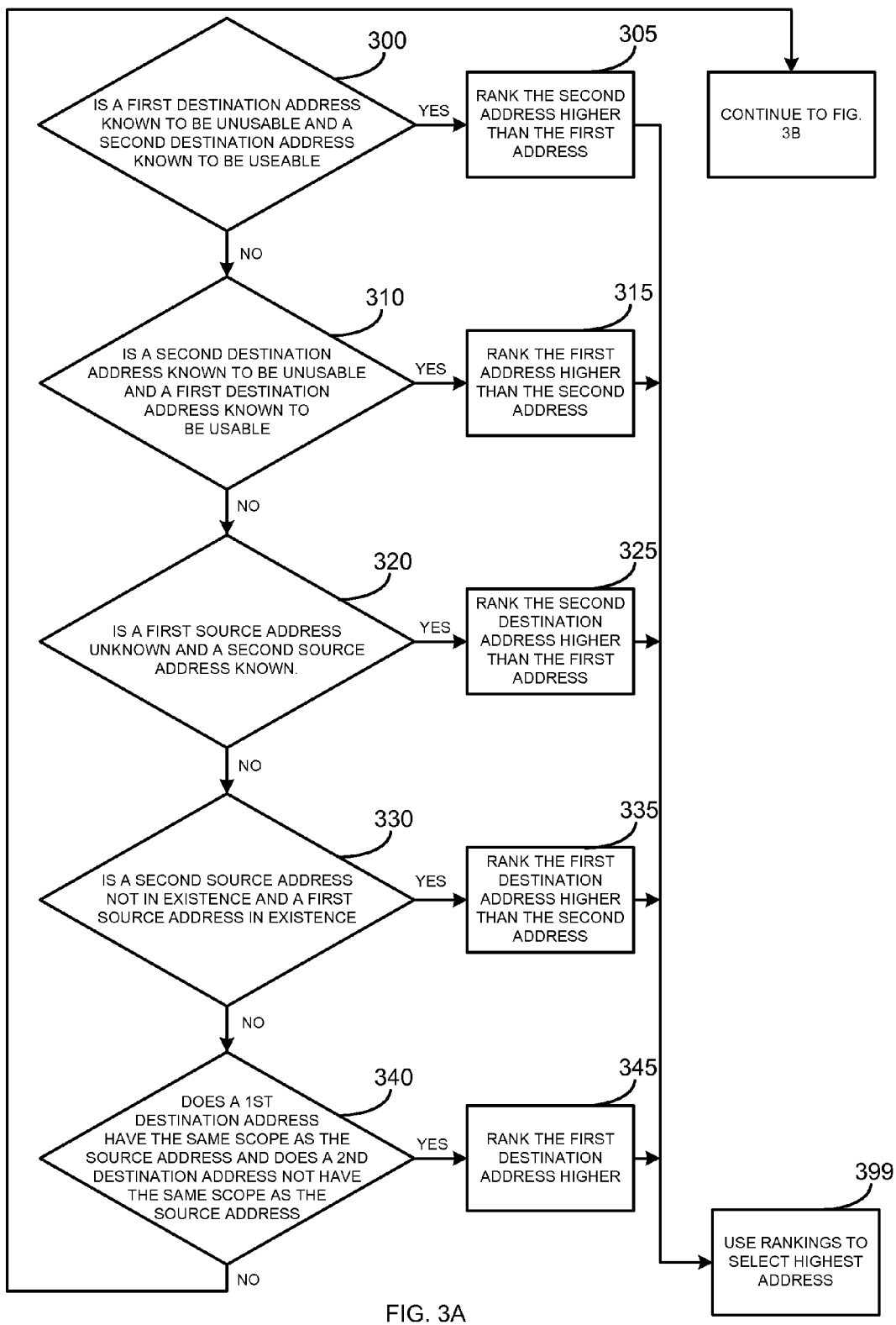
Figure 3B:
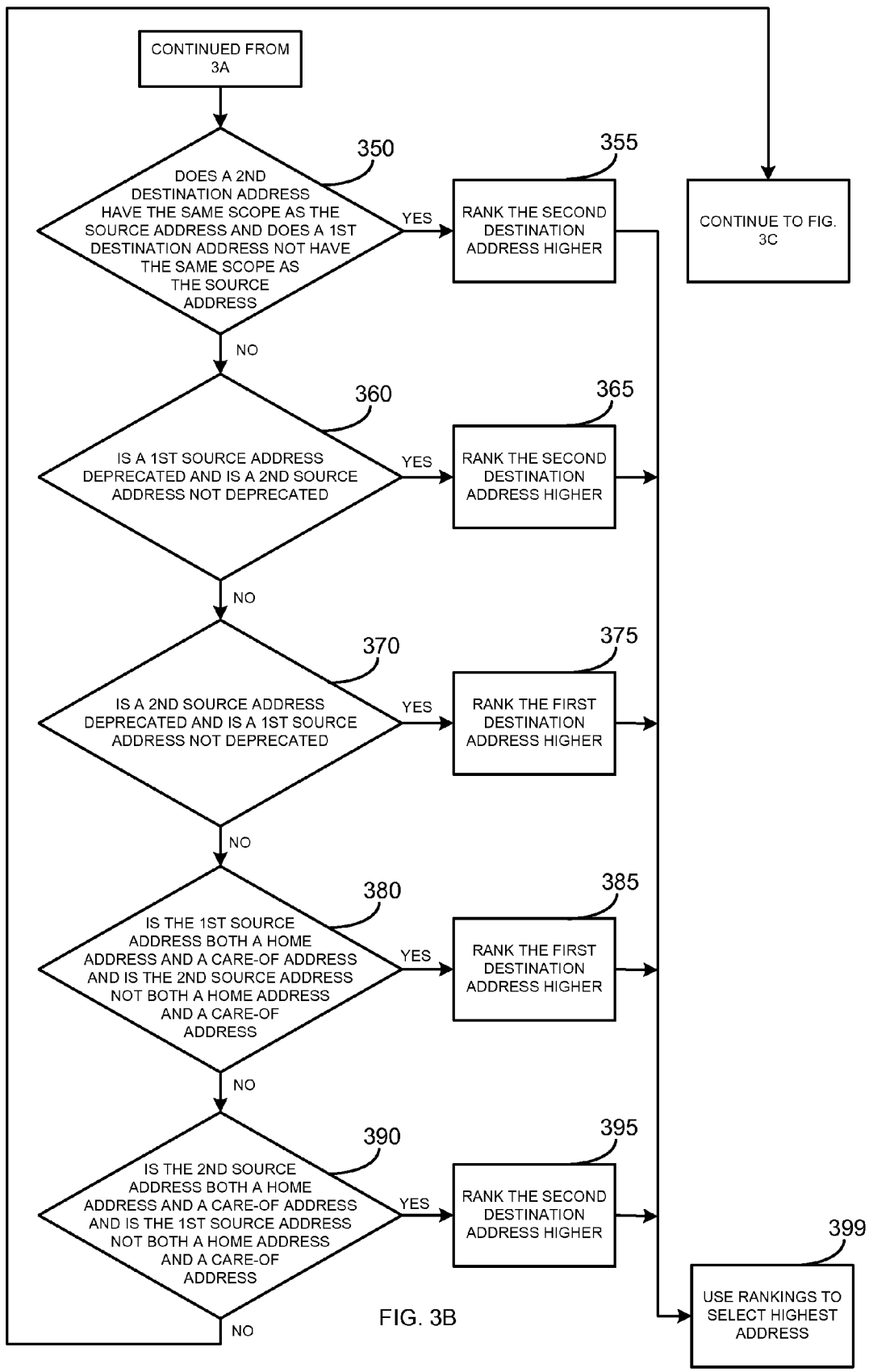
Figure 3C:
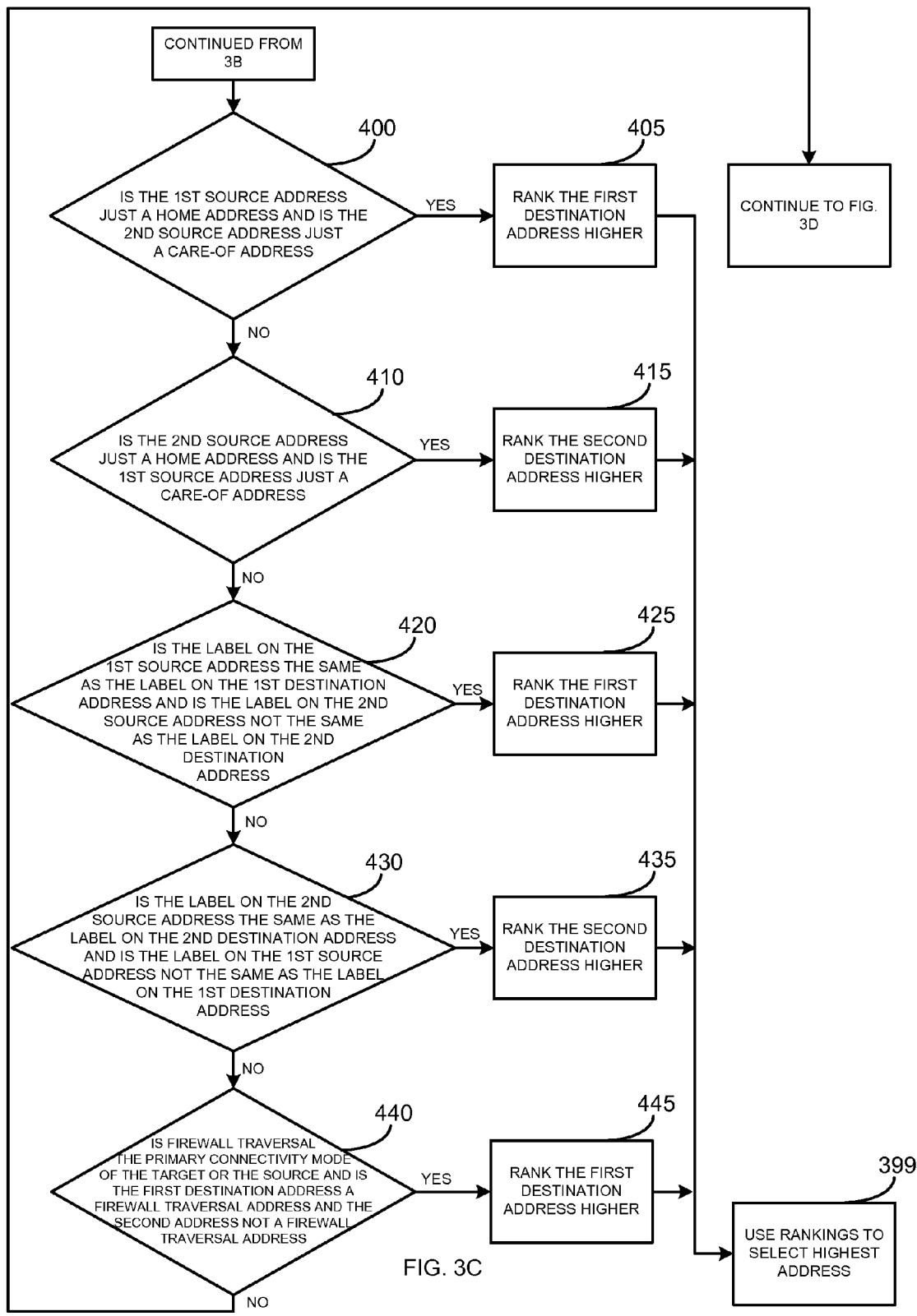
Figure 3D:
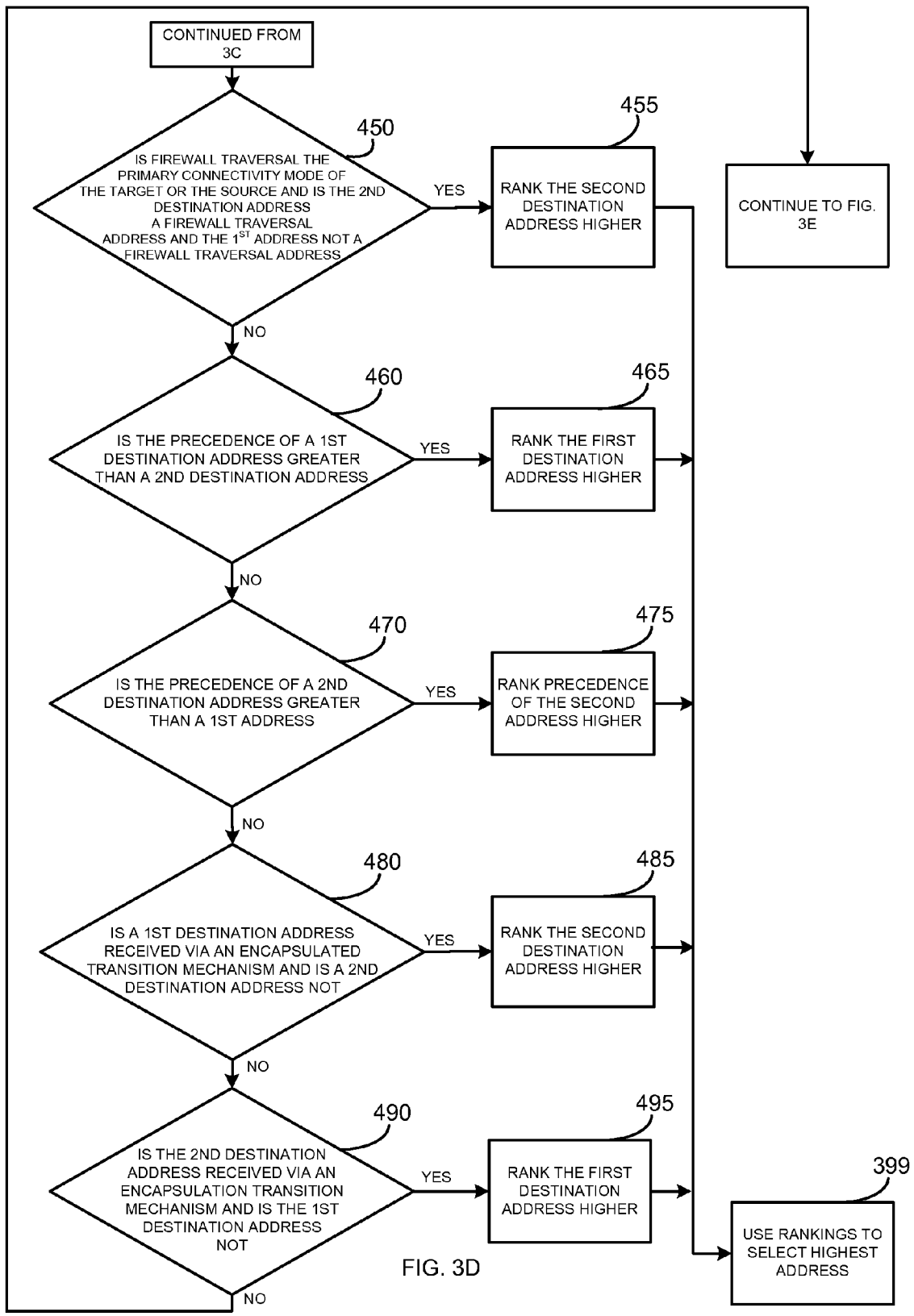

FIG. 2 may illustrate a method of determining an order of a plurality of network addresses for a network port of a computing device to be advertised. The method may be designed to enable a higher probability that the advertised network address will be accessible. The method may not produce the quickest way to contact the node or the result that would yield the fastest throughput connection, but is designed to favor the address that has the highest probability of being available.

At block 200, the method may determine the primary network port connectivity mode for the network port. The standard order of preference for types of connectivity may be as follows: Native IPv6 is most preferred, 6to4 is second, Teredo-tunneled IPv6 is third and Firewall-Traversal tunneling is fourth. The primary port connectivity mode may be the most preferred connectivity type that has full connectivity to the Internet for a particular port. For example, if traffic for port 80 is behind a network address traversal device but not firewalled, the primary port connectivity mode for port 80 is Teredo. Gathering this data would require doing connectivity checks on the specific port the same way that Teredo performs checks on port 12345. In an alternate embodiment, a primary system connectivity mode may be substituted for the primary port connectivity mode. In a PNRP network, the primary connectivity mode of the target may be checked by reviewing the type of address of the first entry in the PNRP Service Location address list.

At block 205, if the primary network port connectivity mode is firewall traversal, control may pass to block 210. If the primary network port connectivity mode is not firewall traversal, control may pass to block 225. At block 210, the firewall traversal address may be ranked first. From block 210, control may pass to block 220 where, if the computing device has native or 6to4 IPv6 addresses, the first elements of the prioritized native/6to4 IPv6 addresses may be used as the remaining addresses and control may pass to block 260.

At block 225, if the primary network port connectivity mode is Teredo, control may pass to block 230. If the primary network port connectivity mode is not Teredo, control may pass to block 250. Teredo is an IPv6 transition technology that provides address assignment and host-to-host automatic tunneling for unicast IPv6 connectivity when IPv6/IPv4 hosts are located behind one or multiple IPv4 network address translators (NATs). To traverse IPv4 NATs, IPv6 packets are sent as IPv4-based User Datagram Protocol (UDP) messages. At block 230, the method may rank the Teredo address as the first address. From block 230, control may pass to block 240 where, if the machine has native or 6to4 IPv6 addresses, the remaining addresses may be the first prioritized native/6to4 IPv6 addresses and control may pass to block 260.

At block 250, if the primary port connectivity mode of the computing device is native or 6to4, control may pass to block 255. If the primary port connectivity mode of the computing device is not native or 6to4, control may pass to block 256 where an error may be returned as no connectivity mode can be determined and the method may end. At block 255, the method may rank the first prioritized native/6to4 IPv6 addresses for all but the last of the result addresses and at block 257, the method may rank the firewall traversal address as the final address and control may pass to block 260 At block 260, the method may end.

At FIG. 3, a method of determining an order of a plurality of network destination addresses for a network port to be contacted may be illustrated. The method may be designed to enable a higher probability that the higher ranked network destination address will be accessible. The method may be described in terms of a list of pair-wise comparison rules that impose (for a given destination address D) a "greater than" ordering on the addresses in the candidate set CandidateSource(D). In the case that a given rule produces a tie, i.e., provides an "equal to" result for the two addresses, the remaining rules are applied (in order) to just those addresses that are tied to break the tie. The address at the front of the list after the algorithm completes is the one the algorithm selects. The combined effect may be to prefer destination/source address pairs for which the two addresses are of equal scope or type, prefer smaller scopes over larger scopes for the destination address, prefer non-deprecated source addresses, avoid the use of transitional addresses when native addresses are available, and all else being equal prefer address pairs having the longest possible common prefix. When comparing two addresses SA and SB from the candidate set, we say "prefer SA" to mean that SA is "greater than" SB, and similarly we say "prefer SB" to mean that SA is "less than" SB.

Destination Address

The pair-wise comparison of destination addresses consists of a series of comparisons, which should be applied in order. Subsequent rules act as tie-breakers for earlier rules. The goal of the comparisons may be to determining an order of a plurality of network destination addresses for a network port to be contacted to enable a higher probability that the higher ranked network destination address will be accessible. This may be different than the goal of find the address that can be reached the fastest. In the algorithm below, some blocks reference the source address used to reach a destination address. This may be specified by the application, or may be determined based on some internal algorithm. Such a source address will not exist in cases where the system does not have any IP address which is legal to use in communication with a given destination address.

At block 300, the method may determine whether a first destination address is known to be unusable and a second destination address is known to be useable. If the answer is no, control may pass to block 310. If the answer is yes, at block 305 the method may rank the second address higher than the first address and control may pass to block 399.

At block 310, the method may determine whether a second destination address is known to be unusable and a first destination address is known to be usable. If the answer is no, the control may pass to block 320. If the answer is yes, at block 315 the method may rank the first address higher than the second address and control may pass to block 399.

At block 320, the method may determine whether a source address to be used with the first destination address (hereafter referred to as the first source address) does not exist and a source address to be used with the second destination address (hereafter referred to as the second source address) does exist. If the answer is no, control may pass to block 330. If the answer is yes, at block 325 the method may rank the second destination address higher than the first address and control may pass to block 399.

At block 330, the method may determine whether a second source address does not exist and a first source address is does exist. If the answer is no, control may pass to block 340. If the answer is yes, at block 335, the method may rank the first destination address higher than the second address and control may pass to block 399.

An implementation may know that a particular destination is unreachable in several ways. For example, the destination may be reached through a network interface that is currently unplugged. As another example, the implementation may retain for some period of time information from Neighbor Unreachability Detection.

At block 340, the method may determine whether a first destination address has the same scope as the source address and a second destination address does not have the same scope as the source address. If the determination is no, control may pass to block 350. If the determination is yes, at block 345, the method may rank the first destination address higher and control may pass to block 399.

At block 350, the method may determine whether a second destination address has the same scope as the source address and a first destination address does not have the same scope as the source address. If the determination is no, control may pass to block 360. If the determination is yes, at block 355, the method may rank the second destination address higher and control may pass to block 399.

Multicast destination addresses have a 4-bit scope field that controls the propagation of the multicast packet. The IPv6 addressing architecture defines scope field values for interface-local (0x1), link-local (0x2), subnet-local (0x3), admin-local (0x4), site-local (0x5), organization-local (0x8), and global (0xE) scopes. Use of the source address selection method in the presence of multicast destination addresses requires the comparison of a unicast address scope with a multicast address scope. Unicast link-local is mapped to multicast link-local, unicast site-local is mapped to multicast site-local, and unicast global scope is mapped to multicast global scope. For example, unicast site-local is equal to multicast site-local, which is smaller than multicast organization-local, which is smaller than unicast global, which is equal to multicast global.

At block 360, the method may determine whether a first source address is deprecated and a second source address is not deprecated. If the determination is no, control may pass to block 370. If the determination is yes, at block 365 the method may rank the second destination address higher and control may pass to block 399.

At block 370, the method may determine whether a second source address is deprecated and a first source address is not deprecated. If the determination is no, control may pass to block 380. If the determination is yes, at block 375 the method may rank the first destination address higher and control may pass to block 399.

Some nodes may support mobility using the concepts of a home address and a care-of address. Conceptually, a home address is an IP address assigned to a mobile node and used as the permanent address of the mobile node. A care-of address is an IP address associated with a mobile node while visiting a foreign link. When a mobile node is on its home link, it may have an address that is simultaneously a home address and a care-of address.

At block 380, the method may determine whether the first source address is both a home address and a care-of address and the second source address is not both a home address and a care-of address. If the determination is no, control may pass to block 390. If the determination is yes, at block 385, the method may rank the first destination address higher and control may pass to block 399.

At block 390, the method may determine whether the second source address is both a home address and a care-of address and the first source address is not both a home address and a care-of address. If the determination is no, control may pass to block 400. If the determination is yes, at block 405, the method may rank the second destination address higher and control may pass to block 399.

At block 400, the method may determine whether the first source address is just a home address and the second source address is just a care-of address. If the determination is no, control may pass to block 410. If the determination is yes, at block 415 the method may rank the first destination address higher and control may pass to block 399.

At block 410, the method may determine whether the second source address is just a home address and the first source address is just a care-of address. If the determination is no, control may pass to block 420. If the determination is yes, at block 425, the method may rank the second destination address higher and control may pass to block 399.

Some nodes may support a policy table used to control the rankings of addresses. This table is often implemented using a "label" for each different class of addresses. Hence the "label" of an address refers to the label in the policy table entry corresponding to the class of addresses to which the address belongs.

At block 420, the method may determine whether the label on first source address is the same as the label on the first destination address and the label on the second source address is not the same as the label on the second destination address. If the determination is no, control may pass to block 430. If the determination is yes, at block 435, the method may rank the first destination address higher and control may pass to block 399.

At block 430, the method may determine whether the label on second source address is the same as the label on the second destination address and the label on the first source address is not the same as the label on the first destination address. If the determination is no, control may pass to block 440. If the determination is yes, at block 445, the method may rank the second destination address higher and control may pass to block 399.

At block 440, the method may determine whether firewall traversal is the primary connectivity mode of the target or the source and the first destination address is a firewall traversal address and the second destination address is not a firewall traversal address. If the determination is no, control may pass to block 450. If the determination is yes, at block 445, the method may rank the first destination address higher and control may pass to block 399. The primary connectivity mode of the target may be determined by checking the type of address of the first entry in the PNRP Service Location address list.

At block 450, the method may determine whether firewall traversal is the primary connectivity mode of the target or the source and the second destination address is a firewall traversal address and the first destination address is not a firewall traversal address. If the determination is no, control may pass to block 460. If the determination is yes, at block 455, the method may rank the second destination address higher and control may pass to block 399.

At block 460, the method may determine whether the precedence of a first destination address is greater than a second destination address. If the determination is no, control may pass to block 470. If the determination is yes, at block 465, the method may rank the first destination address higher and control may pass to block 399.

At block 470, the method may determine whether the precedence of a second destination address is greater than a first address. If the determination is no, control may pass to block 480. If the determination is yes, at block 475, the method may rank precedence of the second address higher and control may pass to block 399.

At block 480, the method may determine whether a first destination address is received via an encapsulated transition mechanism and a second destination address is not. If the determination is no, control may pass to block 490. If the determination is yes, at block 485, the method may rank the second destination address higher and control may pass to block 399.

At block 490, the method may determine whether and if the second destination address is received via an encapsulation transition mechanism and the first destination address is not. If the determination is no, control may pass to block 500. If the determination is yes, at block 495, the method may rank the first destination address higher and control may pass to block 399. An example of an encapsulating transition mechanism may be IPv6 in IPv4.

At block 500, the method may determine whether the scope of the first destination address is less than the scope of the second destination address. If the determination is no, control may pass to block 510. If the determination is yes, at block 505, the method may rank the first destination address higher and control may pass to block 399.

At block 510, the method may determine whether the scope of the second destination address is less than the scope of the first destination address. If the determination is no, control may pass to block 520. If the determination is yes, at block 515, the method may rank the second destination address higher and control may pass to block 399.

At block 520, the method may determine whether the first destination address and the second destination address belong to the same family (both are IPv6 or both are IPv4, for example) and if the common prefix length of the first destination address and the first source address is greater than the common length of the second destination and the second source address. If the determination is no, control may pass to block 530. If the determination is yes, at block 525, the method may rank the first destination address higher and control may pass to block 399.

At block 530, the method may determine whether the common prefix length of the second destination address and the second source address is greater than the common length of the first destination address and the first source address. If the determination is no, control may pass to block 540. If the determination is yes, at block 535, the method may rank the second destination address higher and control may pass to block 399. A common prefix length CommonPrefixLen(A, B) of two addresses A and B may be the length of the longest prefix (looking at the most significant, or leftmost, bits) that the two addresses have in common. It ranges from 0 to 128.

At block 540, if none of the previous blocks have determined a ranking, the method may keep the ranking the same and control may pass to block 399.

At block 399, the results of the comparisons may be used to select a destination address.

As previously mentioned, the network addresses may be used for PNRP. As such, a higher importance may be to actually reach a node address on the first try rather than on speed or bandwidth.

Implementation Considerations

The destination address selection algorithm may need information about potential source addresses. One possible implementation strategy may be for getaddrinfo( ) to call down to the network layer with a list of destination addresses, sort the list in the network layer with full current knowledge of available source addresses, and return the sorted list to getaddrinfo( ). This is simple and may give the useful results but it introduces the overhead of another system call. One way to reduce this overhead may be to cache the sorted address list in the resolver, so that subsequent calls for the same name do not need to resort the list.

Another implementation strategy may be to call down to the network layer to retrieve source address information and sort the list of addresses directly in the context of getaddrinfo( ). To reduce overhead in this approach, the source address information may be cached, amortizing the overhead of retrieving it across multiple calls to getaddrinfo( ). In this approach, the implementation may not have knowledge of the outgoing interface for each destination, so it may use a looser definition of the candidate set during destination address ordering.

In any case, if the implementation uses cached and possibly stale information in its implementation of destination address selection, or if the ordering of a cached list of destination addresses is possibly stale, it may attempt to ensure that the destination address ordering returned to the application is no more than one second out of date. For example, an implementation may make a system call to check if any routing table entries or source address assignments that might affect these algorithms have changed. Another strategy may be to use an invalidation counter that is incremented whenever any underlying state is changed. By caching the current invalidation counter value with derived state and later comparing against the current value, the implementation may detect if the derived state is potentially stale. Well-behaved applications may iterate through the list of addresses returned from getaddrinfo( ) until they find a working address.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A computer executed method of determining an order of a plurality of source network addresses of a computing device to be advertised to enable a higher probability that an advertised source network address of the computing device is accessible, the method comprising:

determining a primary network connectivity mode for a network port of the computing device, the primary network connectivity mode being a most preferred connectivity type for the network port having full connectivity;

determining a primary network address connectivity mode for the network port is firewall traversal, and based on the determination of the primary network address connectivity mode being firewall traversal:

identifying a firewall traversal address of the network port as having a highest probability of accessibility and ranking the firewall traversal address as first in the order of the plurality of source network addresses of the computing device to be advertised, and determining the computing device has native or 6to4 Ipv6 addresses, and based on the determination of the computing device as having the one or more native or 6to4 IPV6 addresses:

identifying each of the one or more native or 6to4 IPv6 addresses as having a probability of accessibility corresponding to a priority of the each one or more of the native or 6to4 IPv6 addresses, ranking the each one or more of the native or 6to4 IPv6 addresses remaining in the order of the plurality of source network addresses in accordance with a coffesponding probability of accessibility, and providing the order of the plurality of source network addresses of the network port for advertisement wherein a highest-ranked source network address in the order has a highest probability of accessibility, wherein a source address in the remaining source addresses corresponding to each one or more of the native or 6to4 IPv6 addresses uses a first element of the one or more native or 6to4 IPv6 addresses;

determining the primary network address connectivity mode for the network port is Teredo, and based on the determination of the primary network address connectivity mode for the network address being Teredo:

identifying a Teredo address of the network port as having a highest probability of accessibility and ranking the Teredo address as first in the order of the plurality of source network addresses of the computing device to be advertised, and determining the computing device has one or more native or 6to4 IPv6 addresses, and based on the determination of the computing device as having one or more native or 6to4 IPv6 addresses:

identifying each of the one or more native or 6to4 Ipv6 addresses as having a probability of accessibility corresponding to a priority of the each one or more of the native or 6to4 IPv6 addresses, ranking the each one or more of the native or 6to4 IPv6 addresses remaining in the order of the plurality of source network addresses in accordance with a conesponding probability of accessibility, and providing the order of the plurality of source network addresses of the network port for advertisement wherein the highest-ranked source network address in the order has a highest probability of accessibility, wherein a source address in the remaining source addresses corresponding to each one or more of the native or 6to4 Ipv6 addresses uses the first element of the one or more native or 6to4 IPv6 addresses;

determining the primary network address connectivity mode for the network port is native or 6to4, and based on the determination of the primary network address connectivity mode being native or 6to4:

identifying a probability of accessibility for any native or 6to4 IPv6 addresses of the network port as not having a lowest probability of accessibility and ranking the any native or 6to4 Ipv6 addresses of the network port as not last in the order of the plurality of source network addresses, identifying a probability of accessibility for a firewall traversal address of the network port has having the lowest probability of accessibility and ranking the firewall traversal address as last in the order of the plurality of source network addresses, and providing the order of the plurality of source network addresses of the network port for advertisement wherein the highest-ranked source network address in the order has a highest probability of accessibility; and determining the primary network address connectivity mode for the network port is not one of firewall traversal, Teredo, native or 6to4, and based on the determination of the primary network address connectivity mode for the network port as not being one of firewall traversal, Teredo, native or 6to4, generating an error indicating no connectivity mode for the network port.

2. The method of claim 1, wherein providing the order of the plurality of source network addresses comprises providing the order of the plurality of source network addresses to an application via an application program interface (API).

3. The method of claim 1, wherein the network port is a PNRP port.

4. The method of claim 3, wherein determining the primary connectivity mode comprises determining the primary connectivity mode by checking a type of address of a first entry in the PNRP Service Location address list.

* * * * *

UNITED STATES PATENT AND TRADEMARK OFFICE
CERTIFICATE OF CORRECTION

PATENT NO. : 7,594,031 B2  Page 1 of 1
APPLICATION NO. : 11/227596
DATED : September 22, 2009
INVENTOR(S) : Horton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1011 days.

Signed and Sealed this

Twenty-eighth Day of September, 2010

David J. Kappos
*Director of the United States Patent and Trademark Office*